(No Model.)
J. G. SCHMIDT.
ROTARY MEAT TENDERER.
No. 411,169. Patented Sept. 17, 1889.
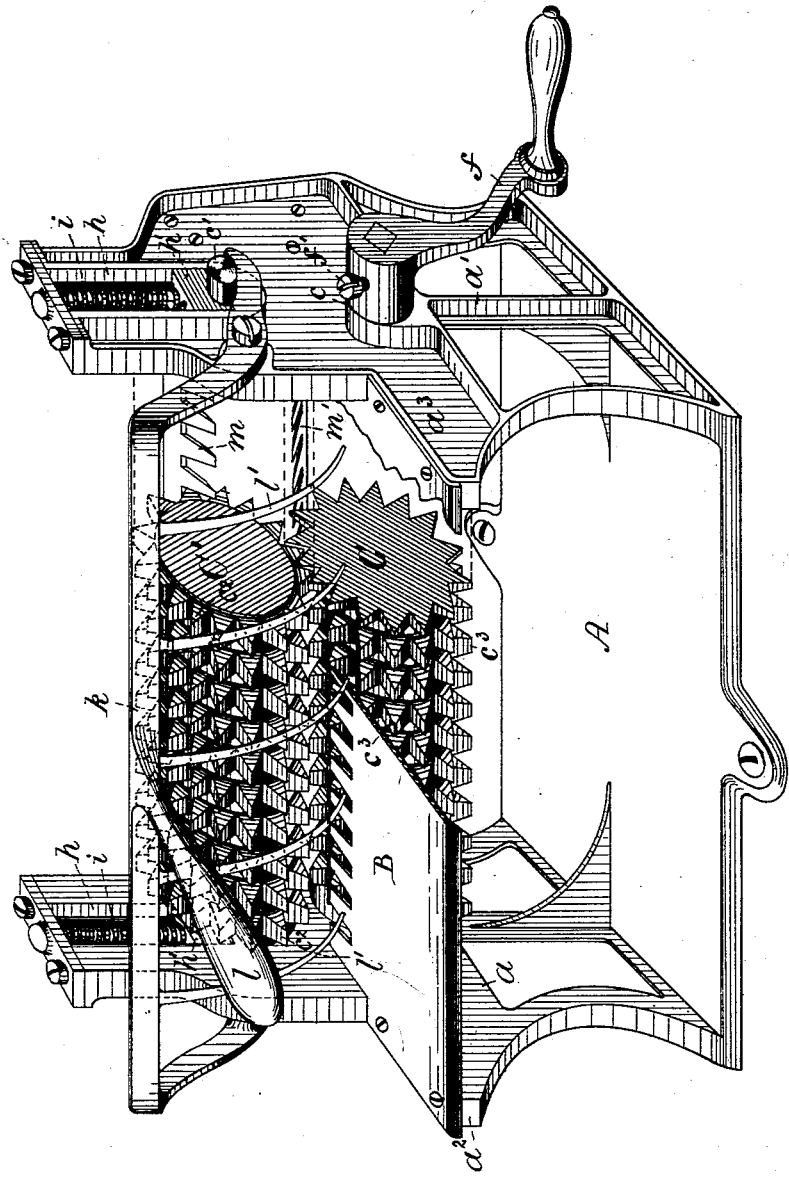
Witnesses:
Hermann Bormann
N. Frederick
Inventor:
John G. Schmidt
By J. Walter Douglass
Att'y

United States Patent Office.

JOHN G. SCHMIDT, OF PHILADELPHIA, PENNSYLVANIA.

ROTARY MEAT-TENDERER.

SPECIFICATION forming part of Letters Patent No. 411,169, dated September 17, 1889.

Application filed September 20, 1888. Serial No. 285,895. (No model.)

*To all whom it may concern:*

Be it known that I, JOHN G. SCHMIDT, a citizen of the United States, residing at the city of Philadelphia, in the county of Philadelphia and State of Pennsylvania, have invented certain new and useful Improvements in Rotary Meat-Tenderers, of which the following is a specification.

The principal object of my invention is to provide a portable device for rendering meat or other similar articles of food tender with the least amount of labor and time.

My invention consists in the novel features of construction and combination of parts constituting a portable device for rendering meat and other articles of food tender hereinafter described.

The characteristic features of my invention will be more fully understood taken in connection with the accompanying drawing, illustrating in perspective my improved meat-tenderer, with the feeding and scraping devices shown in application.

Referring to the drawing, A is the base, provided with two vertical standards $a$ and $a'$.

B is an apron or table suitably mounted on and secured to the projections $a^2$ and $a^3$ of the standards, and this apron or table is provided with a serrated inner extremity for removing or cleaning the material being treated by the rollers, to be described.

C and C' are two puncturing or crushing rollers held in bearings in the upper part of the standards $a$ and $a'$, and provided with knife-edged teeth $c^2$ and $c^3$, arranged in rows around the surface of the rolls with spaces between them, so that the rows of teeth of the lower roller C will occupy positions in the spaces between the rows of teeth of the upper roller C'. On the lower journal $c$ is secured a crank $f$ by means of a tightening-screw $f'$, whereby, when the material to be treated is fed between the puncturing or crushing rollers C and C' in contact with the respective teeth thereof, these rollers will be revolved in opposite directions.

To the tops of the standards $a$ and $a'$ on each side thereof are formed journal-boxes $h$, with pillow-blocks $h'$ in engagement with the journals $c'$ of the upper puncturing or crushing roller C', and between these blocks $h'$ and the tops of the standards $a$ and $a'$ are interposed coiled springs $i$, which are held in proper vertical position therein. Pivoted to the standards $a$ and $a'$ is a U-shaped feeding device $k$, provided with a handle $l$ and a series of curved or other suitable form of prongs $l'$. The extremital portions of the arms of the feeding device $k$ are normally in engagement with the journals $c'$ of the upper puncturing or crushing roller C'. This feeding device so arranged operates to lift the upper roller C' slightly to feed the material between the rollers C and C'. In rear of the device is secured suitable scrapers $m$ and $m'$, set at preferably an angle to the rollers, for removing or cleaning the material undergoing treatment from off the respective rollers, in order that the same may be delivered into any suitable receptacle for use.

The operation of the device is as follows: The meat or other similar material to be rendered tender is placed on the apron or table B and the device $k$ operated by hand to cause the material to be fed to and between the rollers C and C', and by revolving the crank $f$ with the other hand the toothed rollers C and C' will be actuated, thereby causing the sinews of the material undergoing treatment to be punctured in such a manner that when the piece of meat or other material has left the rolls it will present a somewhat similar appearance as a waffle does in its formation in what is commonly known as a "waffle-iron." The scrapers $m$ and $m'$ in rear of the device and located adjacent to the rollers C and C', at preferably an angle thereto, remove or clean off the material from the rollers for its delivery into a suitable receptacle beneath for use.

Having thus described the nature and objects of my invention, what I claim as new, and desire to secure by Letters Patent, is—

1. The combination, with crushing-rolls journaled to standards, an apron with a serrated inner edge, a crank mounted on one of the journals of the lower roll, and scrapers arranged adjacent to said rolls, of a feeding device pivoted to said standards, substantially as and for the purposes set forth.

2. The combination, with end standards, two rollers journaled thereto and provided with knife-edged teeth arranged in rows with spaces between them, means, as described, for permitting of the actuation of said rollers, and scrapers disposed adjacent to said rollers, of a feeding device pivoted to said standards and normally engaging with the journals of the upper roller, supstantially as and for the purposes set forth.

3. The combination of vertical end standards, two toothed rollers journaled thereto, scrapers arranged adjacent thereto, a crank mounted on a journal of the lower roller, a feeding device normally engaging with the journals of the upper roller and operating to raise the same while feeding material between said rollers, and means, substantially as described, for causing the upper roller to again assume its normal operative position, substantially as and for the purposes set forth.

In witness whereof I have hereunto set my signature in the presence of two subscribing witnesses.

JOHN G. SCHMIDT.

Witnesses:
HERMANN BORMANN,
GEO. W. REED.